(12) United States Patent
Slack et al.

(10) Patent No.: US 12,173,761 B1
(45) Date of Patent: Dec. 24, 2024

(54) CLUTCH MECHANISM FOR GRIPPING TOOLS

(71) Applicant: NOETIC TECHNOLOGIES INC., Edmonton (CA)

(72) Inventors: Maurice William Slack, Edmonton (CA); Victor Yung, Edmonton (CA)

(73) Assignee: Noetic Technologies Inc., Edmonton (CA)

( * ) Notice: Subject to any disclaimer, the term of this patent is extended or adjusted under 35 U.S.C. 154(b) by 0 days.

(21) Appl. No.: 18/291,015

(22) PCT Filed: Oct. 13, 2023

(86) PCT No.: PCT/CA2023/051368
§ 371 (c)(1),
(2) Date: Jan. 22, 2024

(87) PCT Pub. No.: WO2024/092342
PCT Pub. Date: May 10, 2024

Related U.S. Application Data

(60) Provisional application No. 63/420,628, filed on Oct. 30, 2022.

(51) Int. Cl.
*F16D 43/21* (2006.01)
*E21B 3/035* (2006.01)
(Continued)

(52) U.S. Cl.
CPC ............ *F16D 43/218* (2013.01); *E21B 3/035* (2013.01); *E21B 17/03* (2013.01); *E21B 19/07* (2013.01);
(Continued)

(58) Field of Classification Search
CPC .......... F16D 7/028; F16D 13/24–13/36; F16D 23/12; F16D 2023/123; F16D 43/218;
(Continued)

(56) References Cited

U.S. PATENT DOCUMENTS 2,150,715 A    3/1939   De Falco
6,076,644 A    6/2000   Forrest et al.
(Continued)

FOREIGN PATENT DOCUMENTS

CA    2606520 A1    11/2006
CA    3191692 A1    5/2022
EP     550261 A2 *  7/1993    ........... F16D 43/216

OTHER PUBLICATIONS

International Search Report re PCT/CA2023/051368, completed by the ISA/CA on Dec. 29, 2023, and mailed by the ISA/CA on Dec. 29, 2023.

(Continued)

*Primary Examiner* — Richard M Lorence
(74) *Attorney, Agent, or Firm* — Donald V. Tomkins

(57) ABSTRACT

An axisymmetric clutch mechanism includes a drive clutch body having a drive bearing surface and a drive clutch surface; an intermediate clutch body having an intermediate clutch surface configured for sliding contacting engagement with the drive clutch surface; a driven clutch body having a driven bearing surface configured for transferring compressive axial force to the drive bearing surface; and rotational drag means for generating resistance to rotational slippage between the drive clutch surface and the intermediate clutch surface. The intermediate and driven clutch bodies are helically coupled in a first rotational direction, forming a first helical coupling having a first lead angle, and with the taper angle of the drive clutch surface and the intermediate clutch surfaces and the first lead angle being selected such that the clutch mechanism will lock when the drive clutch body is rotated relative to the driven clutch body in the first rotational direction.

10 Claims, 12 Drawing Sheets

(51) Int. Cl.
*E21B 17/03* (2006.01)
*E21B 19/07* (2006.01)
*F16D 7/02* (2006.01)

(52) U.S. Cl.
CPC .......... *F16D 7/028* (2013.01); *F16D 2300/06* (2013.01)

(58) Field of Classification Search
CPC ...... F16D 2300/06; E21B 3/022; E21B 3/035; E21B 17/03; E21B 19/07
See application file for complete search history.

(56) References Cited

U.S. PATENT DOCUMENTS

| | | |
|---|---|---|
| 6,409,001 B1 | 6/2002 | Kerr |
| 6,464,061 B1 * | 10/2002 | Inoue ..................... F16D 7/028 188/134 |
| 7,909,120 B2 | 3/2011 | Slack |
| 8,109,375 B2 | 2/2012 | Swanson et al. |
| 8,202,170 B2 | 6/2012 | Smetana et al. |
| 10,094,432 B2 | 10/2018 | Lee |
| 10,302,157 B2 | 5/2019 | Kurth et al. |
| 10,508,695 B2 | 12/2019 | Bauman et al. |
| 11,560,761 B2 | 1/2023 | Slack |
| 2009/0273201 A1 | 11/2009 | Slack |
| 2013/0340574 A1 | 12/2013 | Buchanan |
| 2018/0266500 A1 | 9/2018 | Gotz et al. |
| 2022/0259930 A1 | 8/2022 | Slack |

OTHER PUBLICATIONS

Written Opinion of the International Searching Authority re PCT/CA2023/051368, completed by the ISA/CA on Dec. 20, 2023, and mailed by the ISA/CA on Dec. 29, 2023.

* cited by examiner

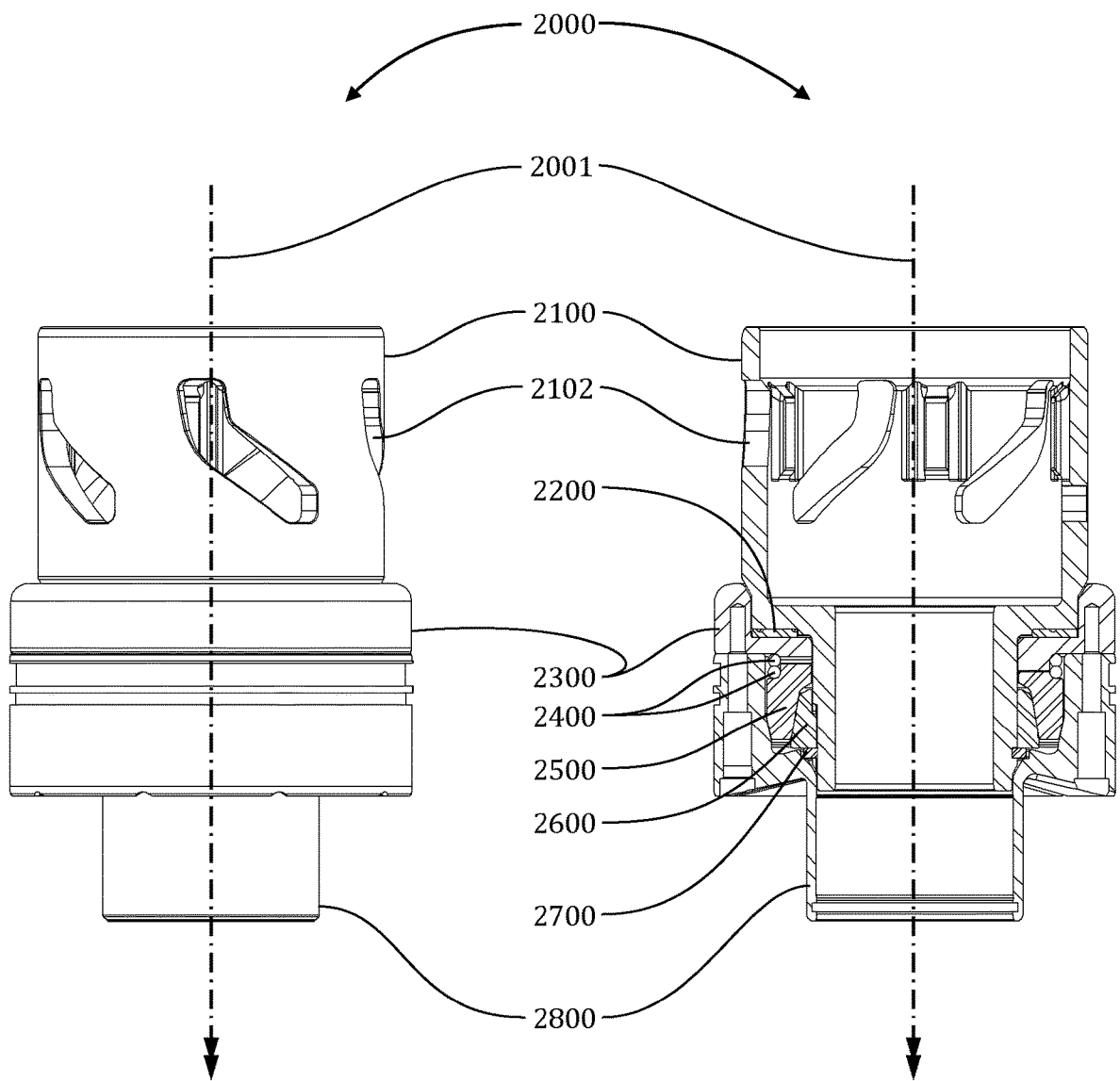
Figure 6　　　　　　　　　　　　　　　　　　Figure 7

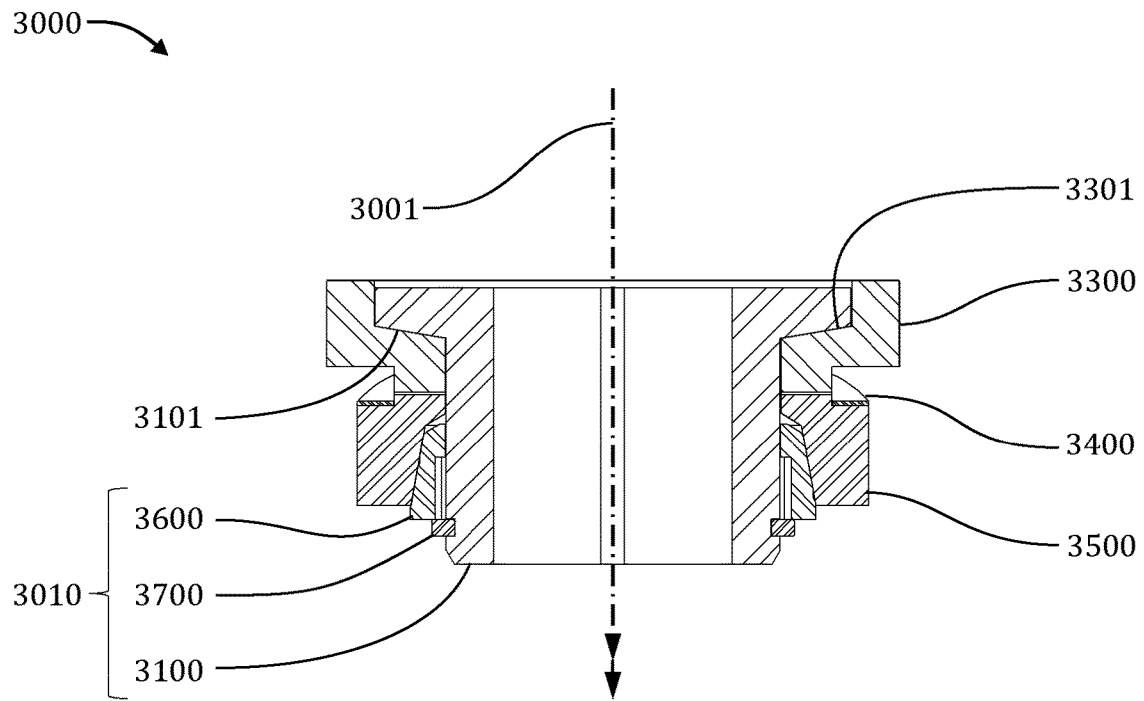
Figure 12
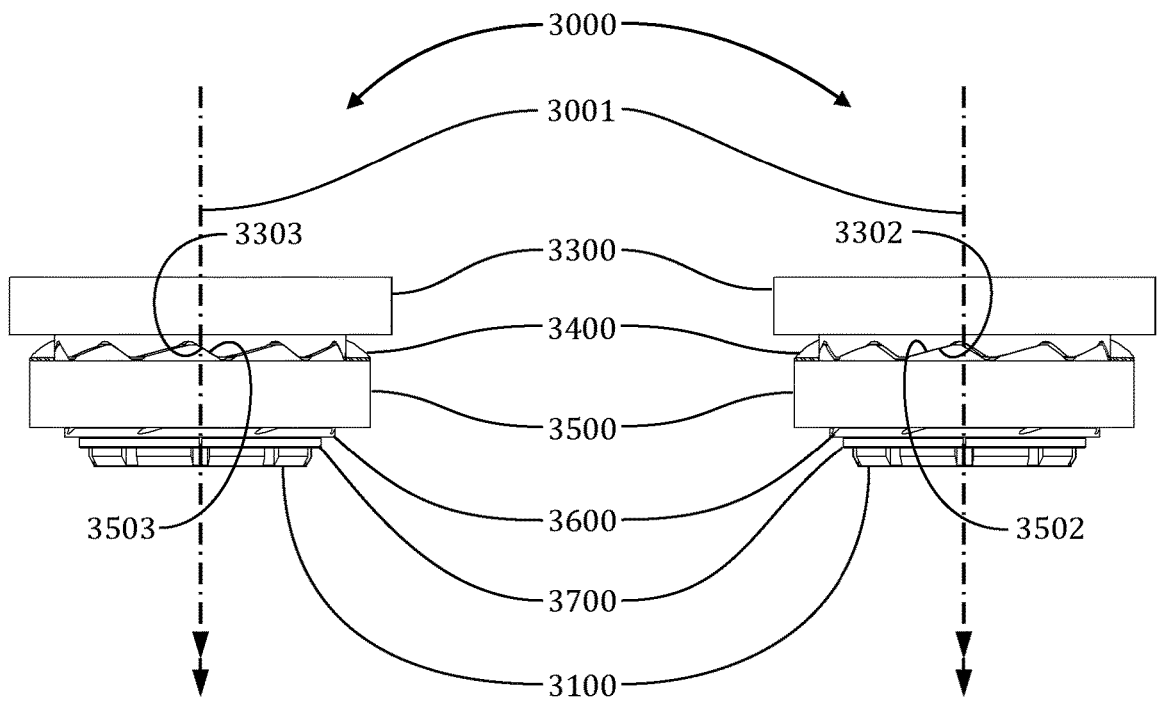
Figure 13
Figure 14

CLUTCH MECHANISM FOR GRIPPING TOOLS

FIELD

The present disclosure relates in general to clutch mechanisms or devices for selectively transferring torque between two pieces of rotating machinery. In particular, the present disclosure relates to clutch mechanisms for gripping tools used in the fields of earth drilling, well construction, and well servicing with drilling rigs and service rigs, such as casing running tools mountable to the top drive of a drilling rig for gripping segments of casing strings being assembled into, deployed in, or removed from a wellbore.

BACKGROUND

The traditional method for running casing or other tubing strings into or out of petroleum wells has been to use power tongs in coordination with the drilling rig's hoisting system. This power tong method allows tubular strings, made up of multiple segments (or "joints") of pipe with mating threaded ends, to be assembled by screwing together the threaded ends to form threaded connections between sequential joints as they are added to the string being installed in the wellbore (i.e., connection "make-up"), or, conversely, for joints to be removed and a tubular string disassembled (i.e., connection "break-out").

However, the power tong method does not simultaneously enable other beneficial functions such as rotating or pushing a tubular string, or fluid filling after a joint is added to or removed from the string, and while the string is being lowered or raised in the wellbore. Running tubulars with power tongs also typically requires the presence of personnel in hazardous locations such as on the rig floor or, more significantly, above the rig floor, on what is commonly called the "stabbing board".

The advent of drilling rigs equipped with top drives has enabled a new method of running tubular strings, and casing strings in particular, where the top drive is equipped with a casing running tool (CRT) to grip the upper joint of the casing string and, in some cases, to seal between the casing and the top drive quill. (It should be understood here that the term "top drive quill" is generally meant to include tubular string components as may be attached to the top drive quill, with the lower end of the attached tubular string components effectively acting as an extension of the quill.) Various CRT devices have been developed that grip the inner surface of casing (herein referred to as CRTi) or that grip the outer surface of casing (herein referred to as CRTe). When used with a top drive. CRTs enable hoisting, rotating, pushing, and filling of the casing string with drilling fluid while running, thus avoiding the above-noted limitations associated with power tongs. Simultaneously, automation of the gripping mechanism, combined with the inherent advantages of the top drive, reduces the level of human involvement required compared with conventional power tong running processes, and thus improves safety.

When running casing with either power tongs or CRTs, the full weight of the casing string extending below the drilling rig is typically supported by rig slips provided in the drill floor while a casing joint (the "active joint") is being added to or removed from the string. As well, make-up torque and break-out torque applied to the active joint must be reacted out of the assembled string; this function is typically provided either by the rig floor slips or by backup tongs, as the case may be.

U.S. Pat. No. 7,909,120 (Slack) discloses a gripping tool that has been used as a CRT, and which may be summarized in general terms as a gripping tool comprising:

a main body assembly (or, more briefly, the main body) having a load adaptor adapted for connection to a drive head such as a top drive quill;

a gripping assembly carried by the main body, having at least one grip surface adapted to move from a radially-retracted position to a radially-extended position in which the grip surface engages either an inner surface or an outer surface of a tubular workpiece upon axial displacement of the main body relative to the grip surface in at least one axial direction; and a linkage acting between the main body and the gripping assembly which translates at least one range of rotational movement in at least one rotational direction into axial movement that tends to urge the grip surface into the engaged position (i.e., gripping a tubular workpiece), and which upon activation exerts an axial force that increases with increased torque, and correspondingly activates radially compressive tractional engagement of the grip surface with the workpiece, with the rotational movement to activate the linkage being bi-directional—i.e., either clockwise or counter-clockwise rotation of the load adaptor relative to the grip surface.

The gripping assembly includes a bumper element configured to contact the upper end of a tubular workpiece and to transfer both axial compressive load and torque between the CRT and the workpiece.

This gripping tool thus utilizes a mechanically-activated grip mechanism that generates its gripping force in response to axial-stroke activation of the gripping assembly. Axial-stroke activation results from one or more of:

the action of an internal spring (which may be an air spring);

gravity acting on the gripping assembly;

externally-applied axial load when hoisting a tubular workpiece; and externally-applied torsional load, in the form of right-hand or left-hand torque when making up or breaking out a threaded tubular connection.

The externally-applied axial or torsional loads are carried through the tool from the load adaptor of the main body to the grip surface of the gripping assembly, in tractional engagement with the workpiece. As will be apparent to persons skilled in the art, the utility of this tool and similar gripping tools is a function of the range of workpiece sizes (typically expressed in terms of minimum and maximum diameters for tubular workpieces) that can be accommodated between the fully-retracted and fully-extended grip surface positions of a given gripping tool (i.e., the radial size and radial stroke of the grip surface). The utility of a given gripping tool can be improved if it can accommodate a greater range of workpiece sizes.

U.S. Pat. No. 8,424,939 (Slack) discloses a gripping tool incorporating a tri-cam linkage with two cam pairs to translate bi-directional rotation into axial movement that has the effect of extending the length of the linkage and thus drives axial-stroke activation of the tool's gripping assembly. The axial operating range of this prior art axial extension linkage is limited by the helical ramp surfaces acting between an intermediate cam body and a driven cam body. This prior art linkage also comprises mating latch hooks (or a "J-latch" mechanism) that, when engaged, will prevent relative axial separation of the drive cam and the driven cam, thus preventing extension of the linkage.

U.S. Pat. No. 11,560,761 (Slack) discloses a variable-length axial linkage for tubular running tools that can provide operational advantages over linkages such as those disclosed in U.S. Pat. Nos. 7,909,120 and 8,424,939, including one or more of the following:

- greater axial operating range of the linkage for a given maximum linkage diameter;
- the ability to transfer both compressive and tensile axial loads when the linkage is unlatched (instead of transferring only compressive axial load when the linkage is unlatched); and
- the ability to re-latch the linkage using any of several alternative operational sequences (instead of the linkage being re-latchable only following one specific operational sequence).

In some operational sequences, re-latching using a variable-length axial linkage as in U.S. Pat. No. 11,560,761 may require the bumper element of the gripping assembly to rotationally slide at the contact interface between the bumper and the tubular workpiece when under application of set-down load, which tends to urge the rotation (as used herein, the term "set-down load" refers to and means axial compressive force transferred through the gripping tool from the top drive to the workpiece). Because the set-down load required to induce rotation is also reacted through the contact interface, the tractional resistance to frictional sliding correlatively increases with increased set-down load tending to urge the rotation. If this resistance exceeds the force urging rotation under application of an operationally acceptable maximum set-down load, then re-latching is prevented.

It is therefore desirable to provide means for reducing the resistance to rotation under application of axial set-down load when re-latching the variable-length linkage while maintaining sufficient resistance to rotation when unlatching and engaging the mechanically-activated tubular running tool.

BRIEF SUMMARY

The present disclosure describes embodiments of a clutch mechanism that is generally axisymmetric about a longitudinal axis of the clutch mechanism, and which in its broadest embodiments comprises:

- a drive clutch body having a drive bearing surface and a frustoconical drive clutch surface;
- an intermediate clutch body having a frustoconical intermediate clutch surface configured for sliding contacting engagement with the frustoconical drive clutch surface;
- a driven clutch body having a driven bearing surface configured for transferring compressive axial force to the drive bearing surface; and
- rotational drag means for generating resistance to rotational slippage between the drive clutch surface and the intermediate clutch surface.

The drive clutch body, the intermediate clutch body, and the driven clutch body are coaxially aligned to the longitudinal axis of the clutch mechanism. The intermediate clutch body and the driven clutch body are helically coupled in a selected first rotational direction relative to the longitudinal axis of the clutch mechanism, forming a first helical coupling having a first lead angle. The taper angle of the drive clutch surface and the intermediate clutch surface and the first lead angle are selected such that the clutch mechanism will lock when the drive clutch body is rotated relative to the driven clutch body in the first rotational direction. Suitable values for the taper angle and the first lead angle will depend upon the coefficients of friction of these contacting surfaces.

It should be noted that all references herein to rotational, axial, and helical motion are relative to the longitudinal axis of the clutch mechanism.

The rotational drag means may be provided as a viscous lubricant between the drive clutch surface and the intermediate clutch surface. Alternatively or in addition, the rotational drag means may be provided as frictional drag induced by the weight of the intermediate clutch body being supported by the driven clutch body.

Alternatively or in addition, the rotational drag means may be provided in the form of axial biasing means generating a clutch preload force urging engagement of the drive clutch surface and the intermediate clutch surface. Such axial biasing means may be provided in the form of any one or more operationally suitable biasing means known to persons skilled in the art, non-limiting examples of which include:

- the weight of the intermediate clutch body being supported by the drive clutch body;
- the weight of the drive clutch body being supported by the intermediate clutch body;
- one or more elastomeric O-rings compressed between the intermediate clutch body and the driven clutch body;
- one or more Belleville washers compressed between the intermediate clutch body and the driven clutch body;
- a wave spring compressed between the intermediate clutch body and the driven clutch body; and
- a coil spring compressed between the intermediate clutch body and the driven clutch body.

In one variant embodiment of a clutch mechanism in accordance with the present disclosure, the axial clutch preload force, the taper angle of the drive clutch surface and the intermediate clutch surface, and the first lead angle are selected such that the clutch mechanism will rotationally slip when a torque of a first selected magnitude in the first rotational direction is transmitted through the clutch mechanism. This operational condition when the clutch mechanism slips is alternatively referred herein to as "over-run" or "an over-running condition". The torque at which over-running will occur (alternatively referred to as the "slip torque") in the first rotational direction will depend upon the selection of particular clutch design parameters, such as the clutch preload, the taper angle of the clutch surfaces, and the first lead angle.

In another variant embodiment of a clutch mechanism in accordance with the present disclosure, the intermediate clutch body and the driven clutch body are also helically coupled in a second rotational direction opposite to the first rotational direction, forming a second helical coupling having a second lead angle. The taper angle of the drive clutch surface and the intermediate clutch surface and the second lead angle are selected such that the clutch mechanism will rotationally slip and transmit minimal torque when the drive clutch body is rotated relative to the driven clutch body in the second rotational direction. The slip torque in the second rotational direction will depend upon the selection of particular clutch design parameters, such as the clutch preload, the taper angle of the clutch surfaces, and the second lead angle.

In a further variant embodiment of a clutch mechanism in accordance with the present disclosure, the intermediate clutch body and the driven clutch body are also helically coupled in a second rotational direction opposite to the first rotational direction, with this helical coupling in the second direction (alternatively referred to herein as "the second helical coupling") having a second lead angle. However, the taper angle of the drive clutch surface and the intermediate clutch surface, and the second lead angle are selected such that the clutch mechanism will lock when the drive clutch body is rotated relative to the driven clutch body in the second rotational direction. Suitable values for the taper angle and the first lead angle will depend upon the coefficients of friction of the these contacting surfaces. When axial biasing means are used in this third variant embodiment, the axial clutch preload force, the taper angle of the drive clutch surface and the intermediate clutch surface and the second lead angle may be selected such that the clutch mechanism will rotationally slip when a torque of a second selected magnitude in the second rotational direction is transmitted through the clutch mechanism.

In some embodiments of clutch mechanisms in accordance with the present disclosure, the drive bearing surface and the driven bearing surface are frustoconical.

It is to be noted that a plurality of clutch mechanisms in accordance with the present disclosure and having different clutch design parameters may be used within a shaft assembly. By way of non-limiting example, a shaft assembly may comprise:
- a first clutch mechanism having axial biasing means and configured to rotationally slip at a selected torque threshold in the first rotational direction, and resultantly having substantial drag in the second rotational direction; and
- a second clutch mechanism configured to lock in the first rotational direction and to have minimal drag in the second rotational direction.

Such a shaft assembly will thus rotationally slip at the selected torque threshold in the first rotational direction, and will have minimal drag in the second selected rotational direction.

BRIEF DESCRIPTION OF THE DRAWINGS

Embodiments will now be described with reference to the accompanying Figures, in which numerical references denote like parts, and in which:

FIG. 6 is an elevation of a bumper assembly incorporating a clutch mechanism in accordance with the present disclosure.

FIG. 7 is a longitudinal cross-section through the bumper assembly in FIG. 6.

FIG. 12 is a longitudinal cross-section through the clutch mechanism in FIG. 11.

FIG. 13 is an elevation of the clutch mechanism in FIG. 11 transmitting left-hand torque relative to the longitudinal axis.

FIG. 14 is an elevation of the clutch mechanism in FIG. 11 transmitting right-hand torque relative to the longitudinal axis.

DETAILED DESCRIPTION

Prior Art Gripping Mechanisms

Figure 1:
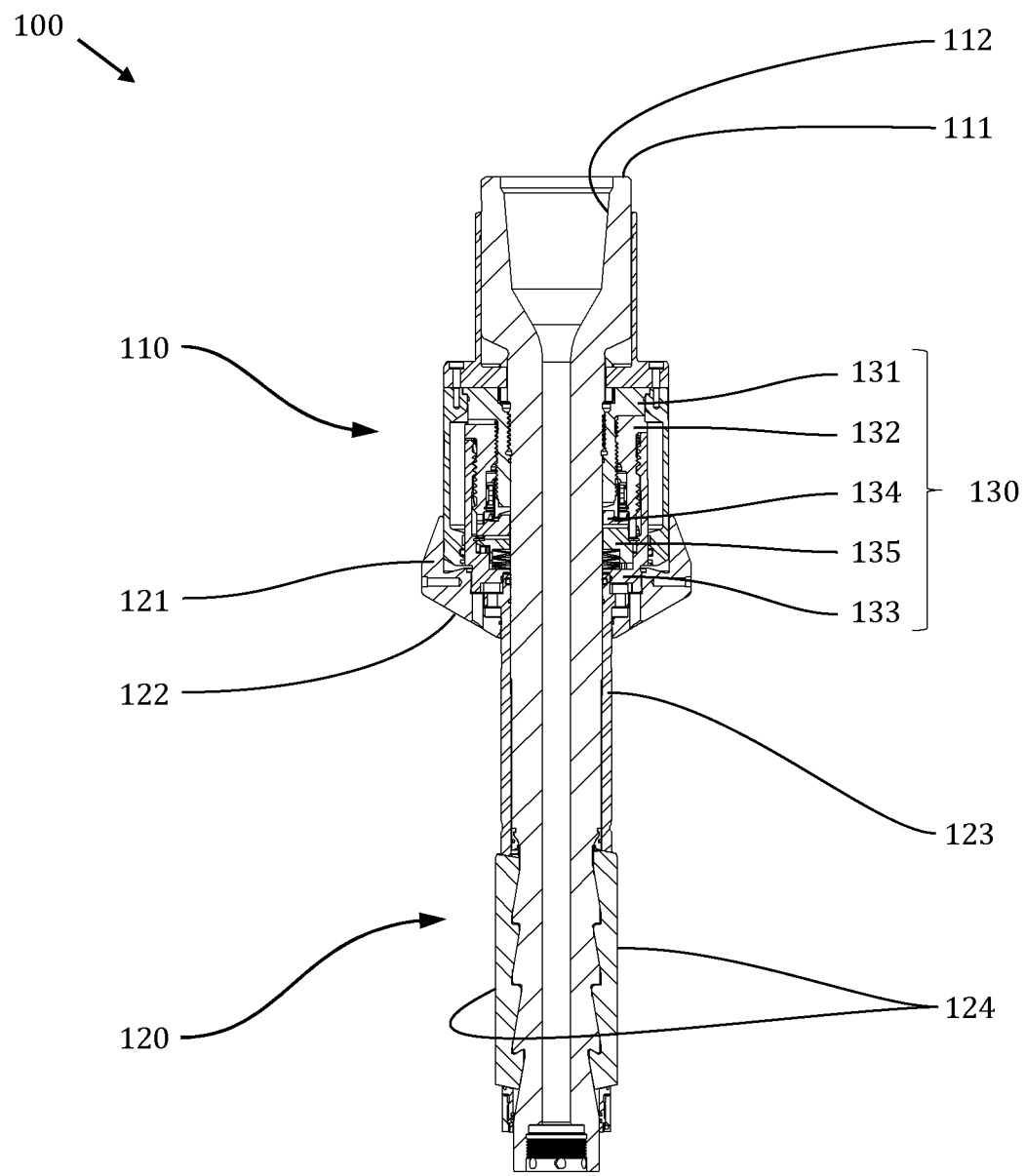
FIG. 1 is a longitudinal cross-section through a prior art CRTi generally corresponding to the CRTi in FIG. 5A in U.S. Pat. No. 11,560,761.

FIG. 1 is a cross-section through a prior art internally-gripping CRT 100 generally corresponding to the CRTi shown in FIG. 5A of U.S. Pat. No. 11,560,761. CRT 100 comprises a main body assembly 110, a gripping assembly 120, and a variable-length axial extension linkage 130. The upper end of main body assembly 110 is provided with a load adaptor 111, illustrated by way of non-limiting example as having a conventional tapered-thread connection 112 for structural connection to a top drive quill (not shown) of a top-drive-equipped drilling rig (not shown).

Gripping assembly 120 defines a land surface 122 that is carried by a bumper 121 attached to a cage 123, plus grip surfaces 124 that are carried by, and axially and rotationally linked, to cage 123. CRT 100 is shown in FIG. 1 as it would appear in the latched position. In this latched position, relative axial movement between main body assembly 110 and gripping assembly 120 is prevented by axial extension linkage 130, such that gripping assembly 120 is held in its retracted position. Axial extension linkage 130 comprises a drive cam body 131, an intermediate cam body 132, a driven cam body 133, a latch body 134, and a striker body 135.

Figure 2:
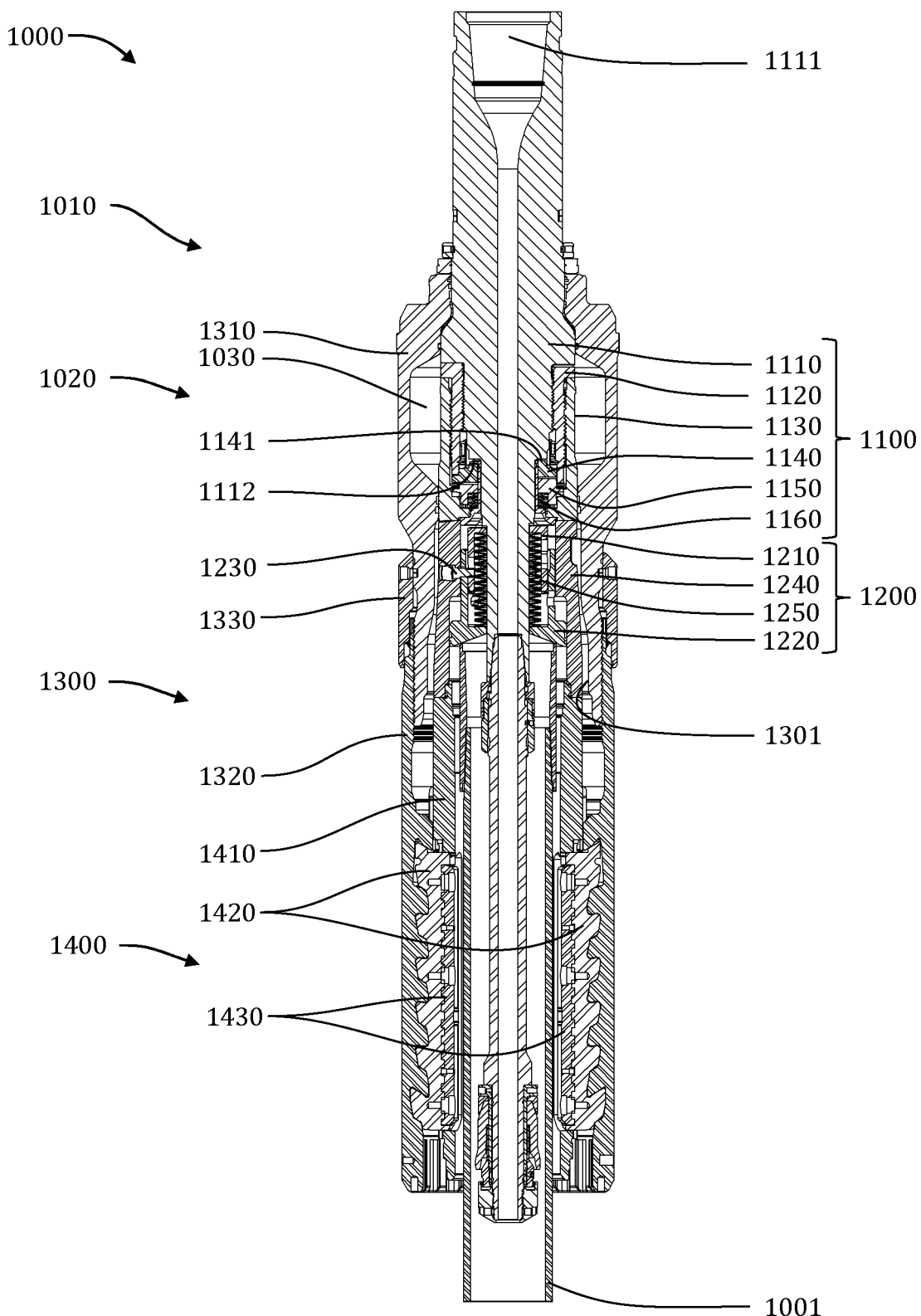
FIG. 2 is a longitudinal cross-section through a prior art CRTe generally corresponding to the CRTe in FIG. 26 in US 2022/0259930 A1 (Slack).

FIG. 2 is a cross-section through a prior art externally-gripping CRT 1000, generally corresponding to the CRTe shown in FIG. 26 in US 2022/0259930 A1, and configured to grip a tubular workpiece 1001. CRT 1000 comprises:
- a variable length axial extension linkage 1100 in accordance with U.S. Pat. No. 11,560,761;
- a latch release mechanism 1200;
- a main body assembly 1300 having a main body bore 1301; and
- a grip assembly 1400 coaxially disposed within the main body bore 1301 of main body assembly 1300.

Figures 3, 4:
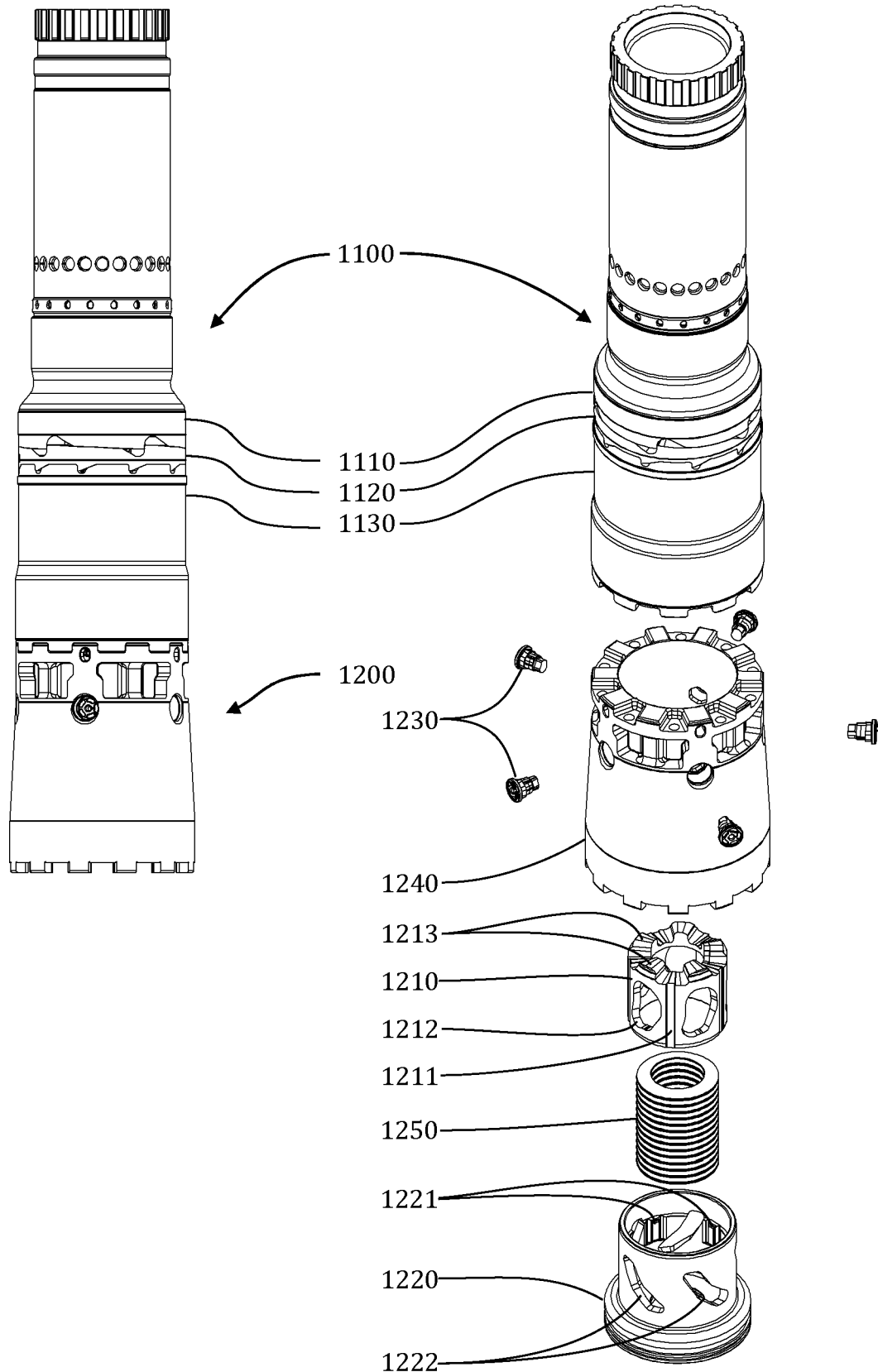
FIG. 3 is an elevation of the variable-length axial linkage and latch release mechanism of the prior art CRTe in FIG. 2.
FIG. 4 is an isometric view of the variable-length axial linkage and latch release mechanism in FIG. 3, with the latch release mechanism shown in exploded view.

FIG. 3 is an elevation of axial extension linkage 1100 and latch release mechanism 1200 of CRT 1000. FIG. 4 is an isometric view of axial extension linkage 1100 and latch release mechanism 1200, with latch release mechanism 1200 shown exploded.

Axial extension linkage 1100 comprises a drive cam body 1110, an intermediate cam body 1120, a driven cam body 1130, a latch body 1140, a striker body 1150, and a striker spring 1160. Drive cam body 1110 comprises a load adaptor 1111 for connecting CRT 1000 to a top drive quill of a top-drive-equipped drilling rig (not shown). Drive cam body 1110 is coupled to intermediate cam body 1120 via a left-hand multi-start thread. Intermediate cam body 1120 is coupled to driven cam body 1130 via a right-hand multi-start thread.

Latch release mechanism 1200 comprises a trigger element 1210, a bumper element 1220, a plurality of trigger followers 1230, a cage connector 1240, and a trigger spring 1250. Main body assembly 1300 comprises a main body upper housing 1310, a main body lower housing 1320, and a main body lock sleeve 1330. Grip assembly 1400 comprises a cage 1410, a plurality of jaws 1420, and a plurality of dies 1430.

Main body assembly 1300 is axially carried by drive cam body 1110. Main body upper housing 1310 is threadingly engageable with main body lower housing 1320, with main body lock sleeve 1330 preventing relative rotation between main body upper housing 1310 and main body lower housing 1320.

Each die 1430 has a grip surface configured for engagement with workpiece 1001. Cage connector 1240 is rigidly coupled to both driven cam body 1130 and cage 1410. Extension of axial extension linkage 1100 causes downward movement of grip assembly 1400 relative to main body assembly 1300, and causes jaws 1420 and dies 1430 to move radially inward to engage workpiece 1001.

An upper latch assembly 1010 of CRT 1000 comprises a drive cam body 1110. A lower latch assembly 1020 of CRT 1000 comprises intermediate cam body 1120, driven cam body 1130, latch body 1140, striker body 1150, and striker spring 1160. Axial extension linkage 1100 has an internal latch that is operable between a latched position and an unlatched position in response to application of relative rotation, and an associated torque, between upper latch assembly 1010 and lower latch assembly 1020 in a first rotational direction.

In the latched position, relative axial separation of upper latch assembly 1010 and lower latch assembly 1020 is constrained. In the unlatched position, relative axial separation of upper latch assembly 1010 and lower latch assembly 1020 is permitted within a defined range for operation of CRT 1000. A gas spring 1030 formed within main body bore 1301 of main body assembly 1300 acts to urge axial separation of upper latch assembly 1010 and lower latch assembly 1020, and thus to urge engagement of dies 1430 with workpiece 1001.

Trigger element 1210, bumper element 1220, and cage connector 1240 are generally cylindrical and coaxially nested. Trigger element 1210 is coupled to bumper element 1220 via a trigger spline 1211 engaging a bumper spline 1221, so as to be axially movable relative to bumper element 1220. Trigger spring 1250 acts between trigger element 1210 and bumper element 1220 to axially urge trigger element 1210 toward drive cam body 1110, and thus bias trigger dog teeth 1213 toward engagement with corresponding trigger reaction dog pockets. Trigger spring 1250 urges bumper element 1220 axially away from trigger element 1210, and thus away from axial extension linkage 1100.

Trigger followers 1230 are rigidly mounted to cage connector 1240. Trigger followers 1230 also are slidingly disposed within corresponding bumper cam slots 1222 in bumper element 1220. Bumper cam slots 1222 are configured such that when bumper element 1220 moves axially relative to cage connector 1240, bumper element 1220 will also rotate relative to cage connector 1240. Trigger followers 1230 also are disposed within corresponding trigger pockets 1212 in trigger element 1210 such that trigger element 1210 is axially and rotationally movable relative to cage connector 1240 within a range defined by trigger pockets 1212.

Figure 5:
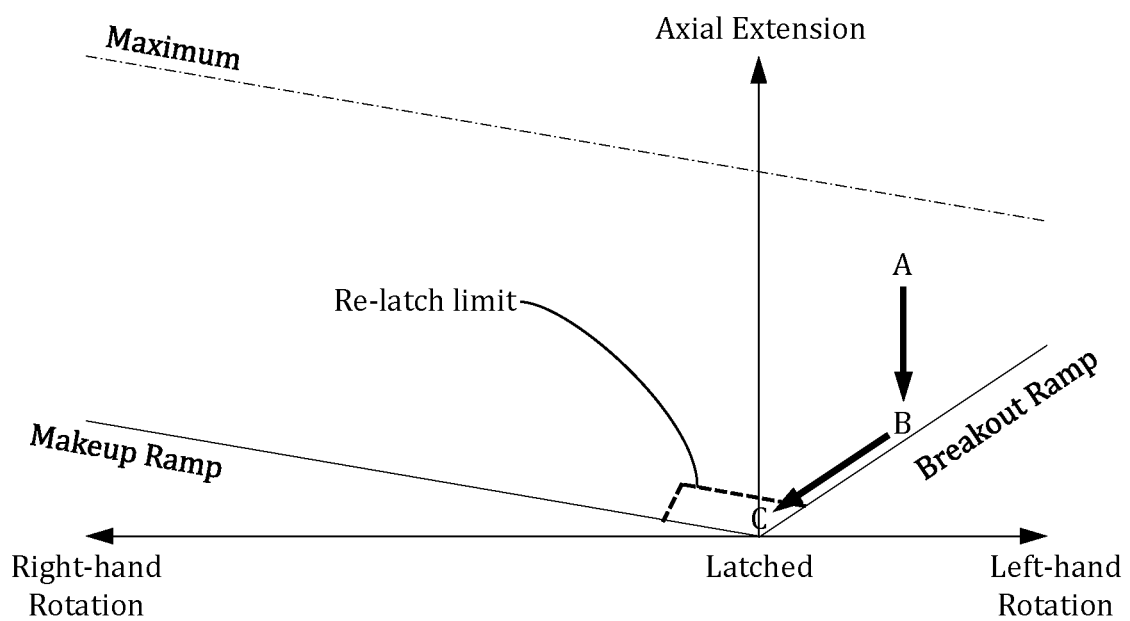
FIG. 5 is a graphical representation of a portion of the operating range of a prior art axial extension linkage in accordance with U.S. Pat. No. 11,560,761.

FIG. 5 is a graphical representation of a portion of the operating range of prior art axial extension linkages in accordance with U.S. Pat. No. 11,560,761, such as linkages 130 and 1100. By drilling convention, right-hand rotation corresponds to clockwise rotation in a plan view (looking down from the top drive toward the rig floor) and left-hand rotation corresponds to counterclockwise rotation in plan view. Axial extension linkages 130 and 1100 may be re-latched following any operational sequence that ends at the latched position. One exemplary operational sequence, which is illustrated by the arrows in FIG. 5, and which could apply to both axial extension linkages 130 and 1100, is described below, by way of non-limiting example, in relation to prior art axial extension linkage 1100:

The operational sequence begins at point A, with axial extension linkage 1100 axially extended and rotationally positioned in left-hand rotation from the latched position.

The drilling rig top drive is lowered relative to a stationary casing string held in the rig floor slips, thereby causing axial extension linkage 1100 to be axially compressed from point A to point B.

At point B, dies 1430 are disengaged from workpiece 1001 and the axial set-down load from the top drive is transferred through CRT 1000 via the contact interface between bumper 1220 and workpiece 1001, thus inducing tractional resistance to rotational slippage at the contact interface.

For the top drive to be lowered further and for axial linkage 1100 to reach the latched position, axially extension linkage 1100 must be compressed and rotated simultaneously from point B to reach point C. The required rotation may occur by right-hand rotation of drive cam body 1110 mounted to the top drive quill via load adaptor 1111, or by left-hand rotation of driven cam body 1130. Driven cam body is 1130 rotationally coupled to bumper element 1220 which contacts workpiece 1001.

If the top drill quill is locked in rotation or otherwise has sufficient resistance to prevent rotation, then lowering the top drive will generate:

a torque urging left-hand rotation of driven cam body 1130 due to the action of the right-hand multi-start thread coupling it to intermediate cam body 1120; and additional set-down load and resultant additional tractional resistance to rotation due to frictional contact at the interface between bumper element 1220 and workpiece 1001.

If the generated torque is insufficient to overcome the tractional resistance to rotation, then axial extension linkage 1100 will resist further compression and will remain at point B, and therefore will not move into the latched position. Embodiments in accordance with the present disclosure can overcome or mitigate this limitation by facilitating re-latching of axial extension linkage 1100 independent of the friction between bumper element 1220 and workpiece 1001 and without top drive rotation.

First Embodiment: Clutch Mechanism for Casing Running Tool

FIG. 6 and FIG. 7, respectively, illustrate a generally axisymmetric bumper assembly 2000 incorporating a clutch mechanism in accordance with the present disclosure in elevation and in longitudinal cross-section. Bumper assembly 2000 is configured to replace bumper element 1220 in prior art CRT 1000 (or may be configured to replace a bumper "analog" in a different prior art CRT).

Figure 8:
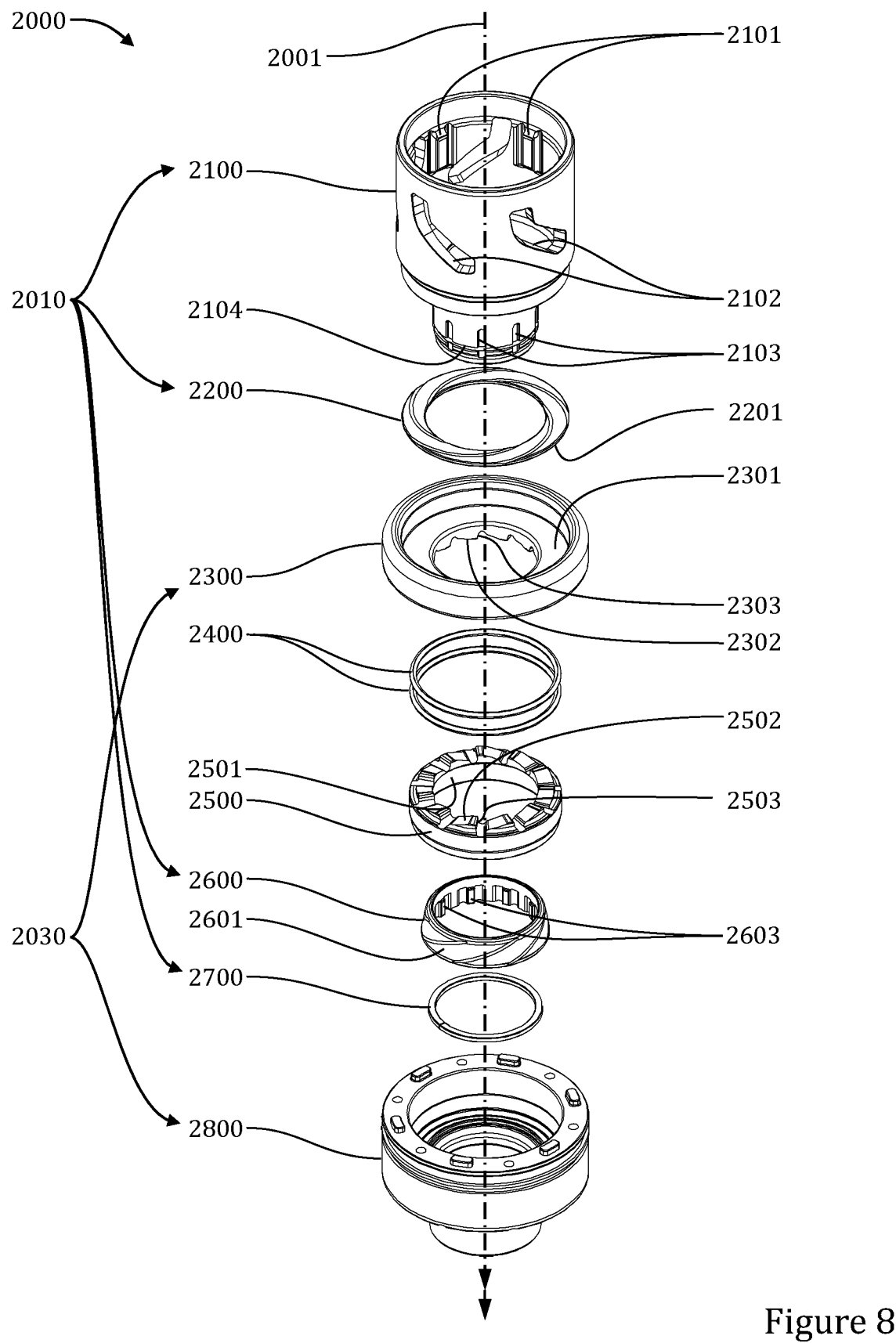
FIG. 8 is an exploded isometric view of the bumper assembly in FIG. 7.

FIG. 8 is an exploded isometric view of bumper assembly 2000, which is generally axisymmetric about a longitudinal axis 2001. For purposes of this patent document, the positive direction of longitudinal axis 2001 is defined downwards for consistency with drilling convention, wherein right-hand rotation corresponds to clockwise rotation in a plan view and left-hand rotation corresponds to counterclockwise rotation in plan view. In the embodiment shown in FIG. 8, bumper assembly 2000 comprises:

- a drive clutch body 2010 comprising;
  - a bumper element 2100 having a bumper-clutch spline 2103 and a groove 2104, coupled to trigger element 1210 of CRT 1000 by engagement of a bumper spline 2101 with trigger spline 1211, and with trigger followers 1230 slidingly disposed within corresponding bumper cam slots 2102 in bumper element 2100;
  - a bushing 2200 having a drive bearing surface 2201;
  - a drive clutch element 2600 having a frustoconical drive clutch surface 2601, and mounted to bumper element 2100 with a drive clutch spline 2603 engaging bumper-clutch spline 2103; and
  - a retaining ring 2700 mounted in groove 2104 and securing drive clutch element 2600 to bumper element 2100;
- an intermediate clutch body 2500 having a frustoconical intermediate clutch surface 2501 configured for sliding contacting engagement with drive clutch surface 2601; helical intermediate clutch ramps 2502; and intermediate clutch stops 2503; and
- a driven clutch body 2030 comprising:
  - a driven clutch element 2300 having a driven bearing surface 2301 configured for transferring compressive axial load to drive bearing surface 2201; helical driven clutch ramps 2302 configured for sliding engagement with intermediate clutch ramps 2502; and driven clutch stops 2303 configured for contacting engagement with intermediate clutch stop 2503; and
  - a bumper plate 2800 rigidly mounted to driven clutch element 2300.

In the particular embodiment shown in FIG. 8, bumper assembly 2000 incorporates optional axial biasing means for generating a "clutch preload" force; i.e., a selected minimum compressive contact force that is transmitted between clutch surfaces 2601 and 2501 and between bearing surfaces 2201 and 2301. In one embodiment of bumper assembly 2000, the axial biasing means is provided solely as the weight of intermediate clutch body 2500 being supported by drive clutch element 2600. In variants of this embodiment, the axial biasing means may additionally include, by way of non-limiting example, a clutch spring comprising either:

- two elastomeric O-rings 2400 compressed between intermediate clutch body 2500 and driven clutch element 2300 when bumper assembly 2000 is assembled (as shown in FIGS. 7 and 8); or
- a pair of Belleville washers (not shown) compressed between intermediate clutch body 2500 and driven clutch element 2300 when bumper assembly 2000 is assembled.

The operation of bumper assembly 2000 may be understood by considering a modified prior art CRT 1000 with bumper assembly 2000 substituted for prior art bumper element 1220. As the modified CRT 1000 is lowered onto workpiece 1001, a compressive axial force will arise when workpiece 1001 contacts bumper plate 2800. The axial force will be transferred from bumper plate 2800 to driven clutch element 2300 to bushing 2200 (which may be provided as a thrust bearing) to bumper element 2100 and then to other components of CRT 1000, including trigger spring 1250. Torque may also be transferred between bumper element 2100 and driven clutch element 2300 via axial contact and resultant friction with bushing 2200.

Figures 9, 10:
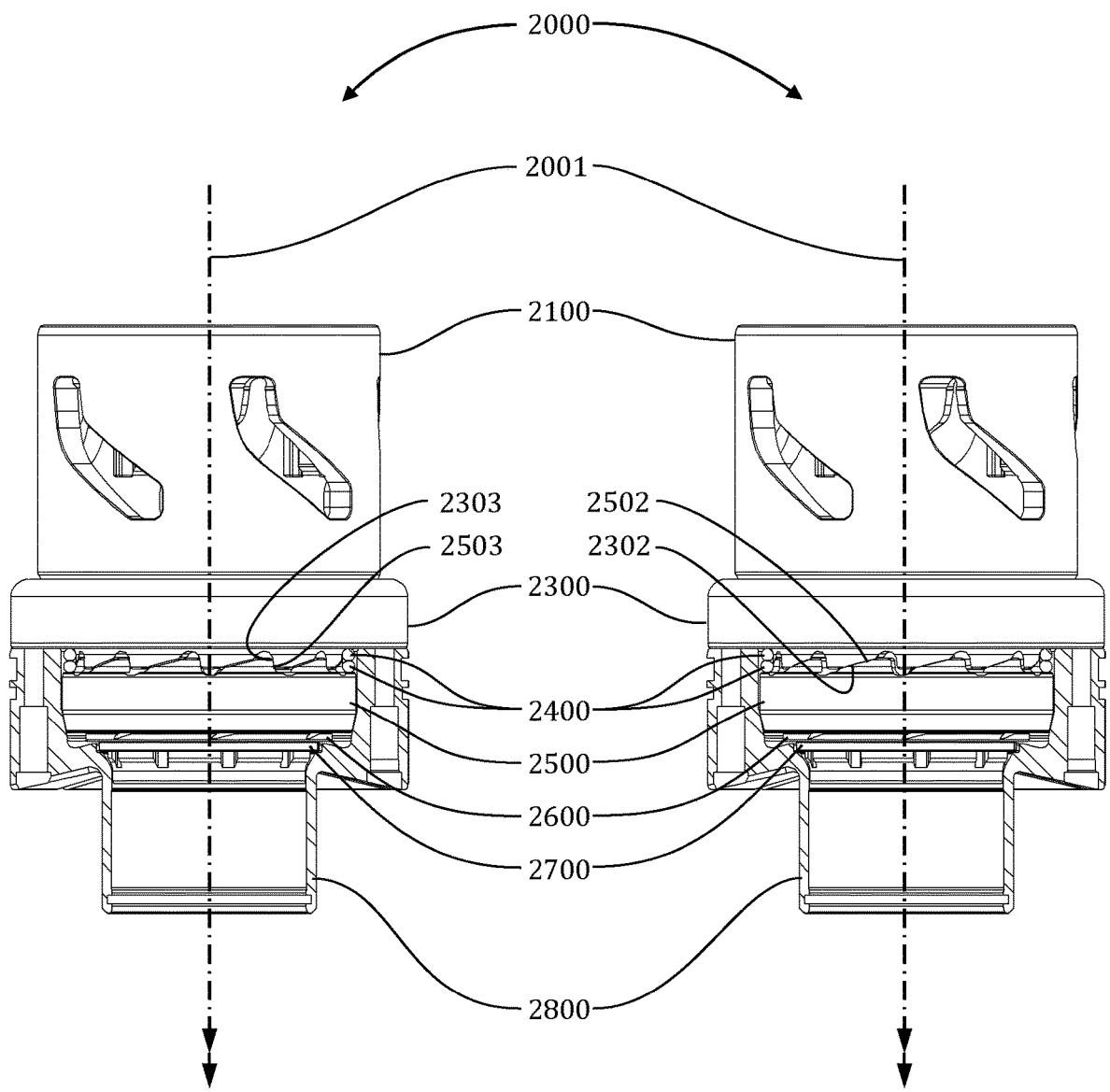
FIG. 9 is an elevation of the bumper assembly in FIG. 7, shown with the bumper plate cut away to reveal the clutch mechanism rotated to an over-running condition.
FIG. 10 is an elevation of the bumper assembly in FIG. 7, shown with the bumper plate cut away to reveal the clutch mechanism rotated to a locked condition.

FIG. 9 is an elevation of bumper assembly 2000, shown with bumper plate 2800 cut away to reveal the clutch mechanism. In this embodiment, the clutch mechanism is configured to over-run in response to left-hand rotation (relative to longitudinal axis 2001) of drive clutch body 2010 relative to driven clutch body 2030. When the clutch mechanism is in an over-running condition, as illustrated in FIG. 9, intermediate clutch stops 2503 contact driven clutch stops 2303, and rotational slip occurs between drive clutch surface 2601 and intermediate clutch surface 2501. The left-hand slip torque will depend upon the selected clutch preload provided by the O-rings 2400 (axial biasing means) and other clutch design parameters (such as the coefficient of friction between the clutch surfaces) as will be apparent to persons of skilled in the art.

FIG. 10 is an elevation of bumper assembly 2000, shown with bumper plate 2000 cut away to reveal the clutch mechanism rotated to a locked condition. In this embodiment, the clutch mechanism is configured to lock in response to right-hand rotation (relative to longitudinal axis 2001) of drive clutch body 2010 relative to driven clutch body 2030. Intermediate clutch ramps 2502 contact driven clutch ramps 2302 and convert right-hand torque transmitted through the clutch mechanism into additional compressive contact force between drive clutch surface 2601 and intermediate clutch surface 2501. This additional compressive contact force increases the maximum torque that can be transmitted through the clutch mechanism via friction between clutch surfaces 2601 and 2501. Depending upon the selection of particular clutch design parameters (including the clutch preload, the lead angle of mating helical ramps 2502 and 2302, and the taper angle of mating frustoconical clutch surfaces 2601 and 2501), the clutch mechanism either may rotationally slip when a right-hand torque of a selected magnitude ("selected right-hand slip torque") is reached, or it may remain locked. Suitable values for the lead angle of helical ramps 2502 and 2302 and the taper angle of clutch surfaces 2601 and 2501 will depend upon the coefficients of friction of these contacting surfaces.

At least a portion of the clutch preload and the additional compressive contact force generated by ramps 2502 and 2302 will be transmitted from intermediate clutch body 2500 to bumper element 2100 via bushing 2200 (i.e. through contact between bearing surfaces 2201 and 2301), which will further react a portion of the torque transmitted through bumper assembly 2000 correlative to the rotary sliding resistance through bushing 2200, and thus will generally increase the maximum torque that can be transmitted through bumper assembly 2000.

Referring again to FIG. 5. CRT 1000 assembled with bumper assembly 2000 installed in place of bumper element 1220 enables re-latching of axial extension linkage 1100 from point B to point C without requiring rotation of the top drive quill and without requiring rotational slip between the bumper plate 2800 and workpiece 1001. Instead, the clutch mechanism within bumper assembly 2000 over-runs in left-hand rotation at a set-down load independent of the rotational resistance of either the top drive or tractional resistance due to frictional contact between bumper element 1220 and workpiece 1001.

It will now be apparent that bumper assembly 2000 allows control of the set-down load required to induce latching rotation to ensure that it falls below an acceptable operational limit, because the resistance to rotation under set-down load is controlled by the tractional resistance to rotation through bushing 2200 carrying the axial set-down load. Bushing 2200 can be variously configured by selection of clutch design parameters such as bushing material, geometry of sliding surfaces, and lubrication. Optionally, bushing 2200 may be provided as an axial thrust bearing, to selectively control the tractional resistance to rotation to meet the requirements of a broad range of applications.

Axial extension linkage 1100 may be unlatched by the top drive quill applying right-hand rotation (and torque) to drive cam body 1110 of CRT 1000 through load adaptor 1111. This operational sequence would correspond with moving from point C to point D in FIG. 5. The right-hand torque must be transmitted through bumper assembly 2000 to workpiece 1001, which is provided by the right-hand rotation locking response and the selected right-hand slip torque of the clutch mechanism within bumper assembly 2000.

Second Embodiment: Standalone Clutch Mechanism

Figure 11:
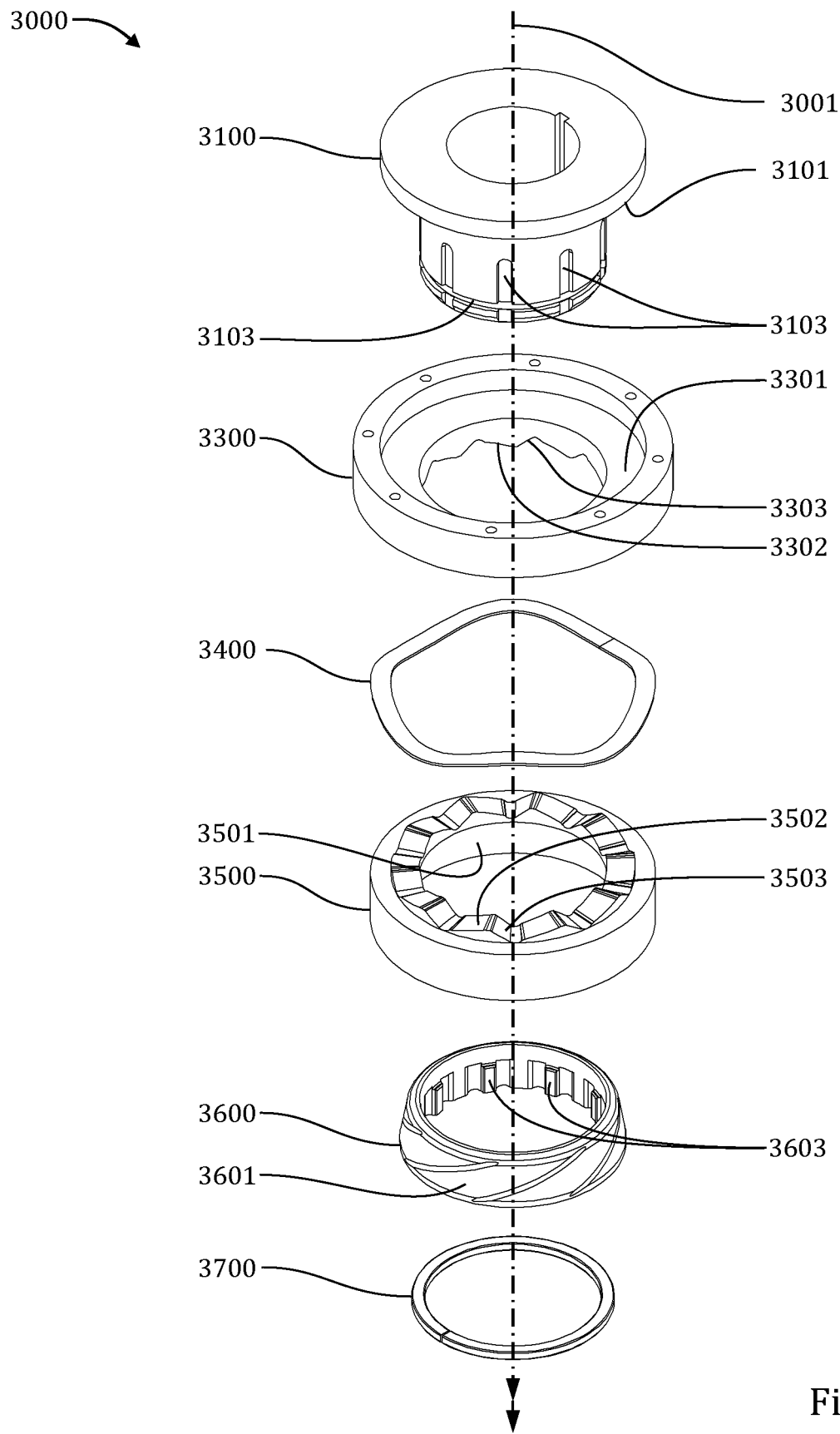
FIG. 11 is an exploded isometric view of a second exemplary embodiment of a clutch mechanism in accordance with the present disclosure.

FIG. 11 is an exploded isometric view of a second exemplary embodiment 3000 of a clutch mechanism in accordance with the present disclosure. Clutch mechanism 3000 is generally axisymmetric about a longitudinal axis 3001, and comprises:
  a drive clutch body 3010 comprising:
    a drive element 3100 having a frustoconical drive bearing surface 3101, a drive element spline 3103, and a groove 3104;
    a drive clutch element 3600 having a frustoconical drive clutch surface 3601, and being mounted to drive element 3100 with a drive clutch spline 3603 engaging drive element spline 3103; and
    a retaining ring 3700 mounted in groove 3104 and securing drive clutch element 3600 to drive element 3100;
  an intermediate clutch body 3500 having a frustoconical intermediate clutch surface 3501 configured for sliding contacting engagement with drive clutch surface 3601, helical intermediate clutch right-hand ramps 3502, and helical intermediate clutch left-hand ramps 3503;
  a driven clutch body 3300 having a frustoconical driven bearing surface 3301 configured for transferring compressive axial load to frustoconical drive bearing surface 3101; helical driven clutch right-hand ramps 3302 configured for sliding contacting engagement with intermediate clutch right-hand ramps 3502, and helical driven clutch left-hand ramps 3303 configured for sliding contacting engagement with intermediate clutch left-hand ramps 3503; and
  a wave spring 3400 (axial biasing means).

FIG. 12 is a longitudinal cross-section through clutch mechanism 3000. Wave spring 3400 generates a selected minimum compressive contact force ("clutch preload") that is transmitted between clutch surfaces 3601 and 3501, and between frustoconical bearing surfaces 3101 and 3301.

FIG. 13 is an elevation of clutch mechanism 3000 transmitting left-hand torque (with wave spring 3400 shown in section to better illustrate the mechanism's operation). Clutch mechanism 3000 is configured to lock in response to left-hand rotation (relative to longitudinal axis 3001) of drive clutch body 3010 relative to driven clutch body 3300. Intermediate clutch left-hand ramps 3503 contact driven clutch left-hand ramps 3303, and convert left-hand torque transmitted between intermediate clutch body 3500 and driven clutch body 3300 into additional compressive contact force between drive clutch surface 3601 and intermediate clutch surface 3501 (and between drive bearing surface 3101 and driven bearing surface 3301). This additional compressive contact force increases the maximum torque that can be transmitted through clutch mechanism 3000 via friction between clutch surfaces 3601 and 3501 (and between bearing surfaces 3101 and 3301). Depending upon the selection of particular clutch design parameters (including the clutch preload, the lead angle of left-hand ramps 3503 and 3303, the taper angle of frustoconical bearing surfaces 3101 and 3301, and the taper angle of frustoconical clutch surfaces 3601 and 3501), clutch mechanism 3000 either may rotationally slip when a left-hand torque of a selected magnitude is reached, or it may remain locked. Suitable values for the lead angle left-hand ramps 3503 and 3303 and the taper angle of clutch surfaces 3601 and 3501 will depend upon the coefficients of friction of these contacting surfaces.

FIG. 14 is an elevation of clutch mechanism 3000 transmitting right-hand torque (with wave spring 3400 shown in section to better illustrate the mechanism's operation). Clutch mechanism 3000 is configured to lock in response to right-hand rotation (relative to longitudinal axis 3001) of drive clutch body 3010 relative to driven clutch body 3300. Intermediate clutch right-hand ramps 3502 contact driven clutch right-hand ramps 3302 and convert right-hand torque transmitted through clutch mechanism 3000 into additional compressive contact force between drive clutch surface 3601 and intermediate clutch surface 3501. This additional compressive contact force increases the maximum torque that can be transmitted through clutch mechanism 3000 via friction between clutch surfaces 3601 and 3501. Depending upon the selection of particular clutch design parameters (including the clutch preload, the angle of right-hand ramps 3502 and 3302, the angle of frustoconical bearing surfaces 3101 and 3301, and the angle of frustoconical clutch surfaces 3601 and 3501), clutch mechanism 3000 either may rotationally slip when a right-hand torque of a selected magnitude is reached, or it may remain locked. Suitable values for the lead angle right-hand ramps 3502 and 3302 and the taper angle of clutch surfaces 3601 and 3501 will depend upon the coefficients of friction of these contacting surfaces.

Third Embodiment: Clutch Mechanism Using Helical Thread Coupling

Figure 15:
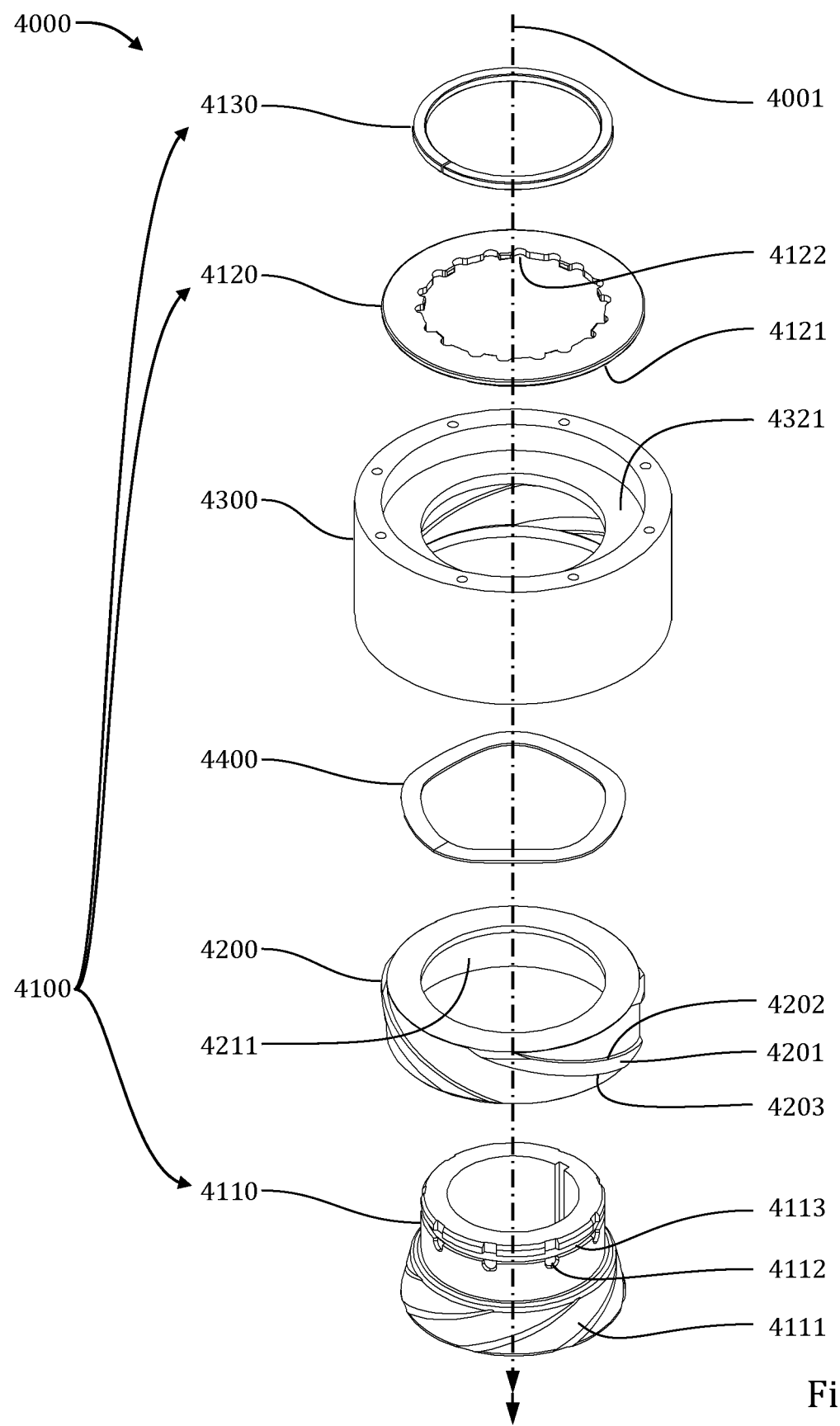
FIG. 15 is an exploded isometric view of a third exemplary embodiment of a clutch mechanism in accordance with the present disclosure.
Figure 16:
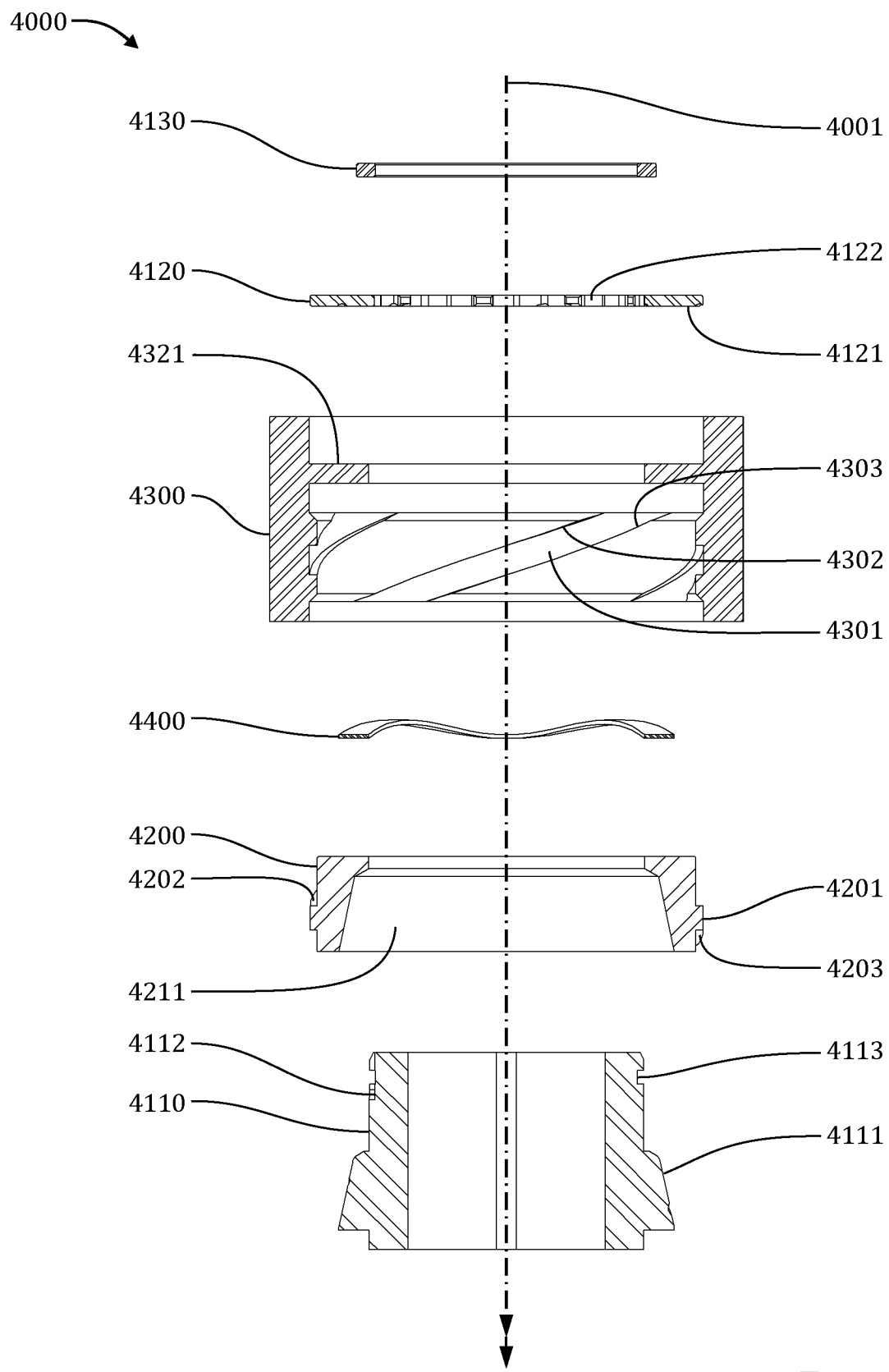
FIG. 16 is an exploded longitudinal cross-section through the clutch mechanism in FIG. 15.

FIG. 15 is an exploded isometric view of a third exemplary embodiment 4000 of a clutch mechanism in accordance with the present disclosure. FIG. 16 is an exploded longitudinal cross-section through clutch mechanism 4000. Clutch mechanism 4000 is generally axisymmetric about a longitudinal axis 4001, and comprises:
  a drive clutch body 4100 comprising:
    a drive clutch element 4110 having a frustoconical drive clutch surface 4111;
    a bushing 4120 having a drive bearing surface 4121; and
    a retaining ring 4130;

an intermediate clutch body 4200 having a frustoconical intermediate clutch surface 4211 configured for sliding contacting engagement with drive clutch surface 4111;

a driven clutch body 4300 having a driven bearing surface 4321 configured for transferring compressive axial force to drive bearing surface 4121; and a wave spring 4400 (axial biasing means).

Figures 17, 18:
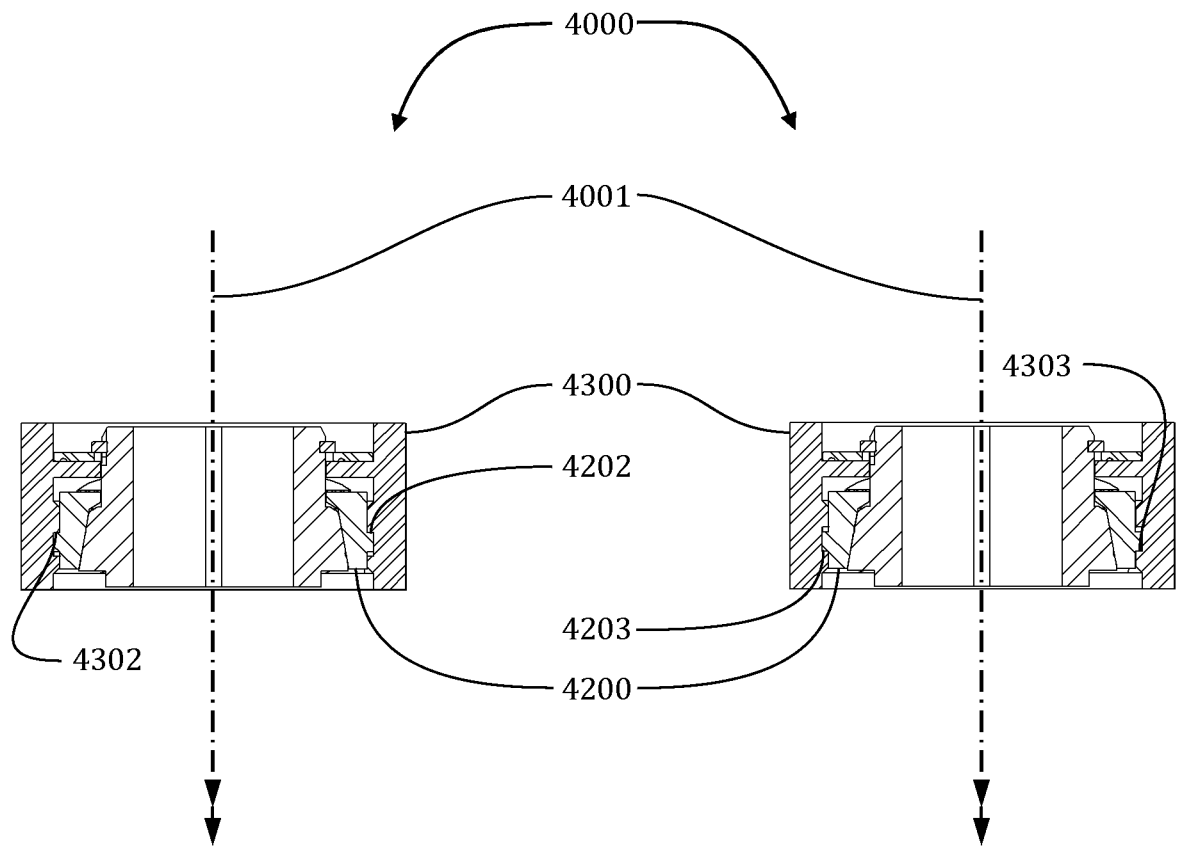
FIG. 17 is a longitudinal cross-section through the clutch mechanism in FIG. 15 rotated to an over-running condition.
FIG. 18 is a longitudinal cross-section through the clutch mechanism in FIG. 15 rotated to a locked condition.

When clutch mechanism 4000 is assembled as shown in FIGS. 17 and 18, drive clutch body 4100, intermediate clutch body 4200, and driven clutch body 4300 are coaxially aligned with longitudinal axis 4001. Bushing 4120 is mounted on drive clutch element 4110 with an inner bushing spline 4122 on bushing 4120 engaging an outer drive spline 4112 on drive clutch element 4110. Bushing 4120 is secured to drive clutch element 4110 by installation of retaining ring 4130 in groove 4113 on drive clutch element 4110.

Wave spring 4400 acts between intermediate clutch body 4200 and driven clutch body 4300, and generates a clutch preload force that is transmitted between clutch surfaces 4111 and 4211, and between bearing surfaces 4121 and 4321.

Intermediate clutch body 4200 and driven clutch body 4300 are helically coupled relative to longitudinal axis 4001 via an outer multi-start thread 4201 on intermediate clutch body 4200 engaging an inner multi-start thread 4301 on driven clutch body 4300. Outer multi-start thread 4201 has upward-facing clutch engagement flanks 4202 and downward facing clutch disengagement flanks 4203. Inner multi-start thread 4301 has downward-facing clutch engagement flanks 4302 and upward-facing clutch disengagement flanks 4303.

The taper angle of frustoconical clutch surfaces 4111 and 4211, and the lead angle of multi-start threads 4201 and 4301 are selected such that clutch mechanism 4000 will:

engage and lock when drive clutch body 4100 is rotated in the left-hand direction relative to driven clutch body 4300; and release and over-run when drive clutch body 4100 is rotated in the right-hand direction relative to driven clutch body 4300.

FIG. 17 is a longitudinal cross-section through clutch mechanism 4000 with drive clutch body 4100 rotated, in the left-hand direction relative to driven clutch body 4300, to a locked condition. Engagement flanks 4202 and 4302 are in contact and left-hand torque transmitted through multi-start threads 4201 and 4301 will increase the contact force between clutch surfaces 4111 and 4211 (and between bearing surfaces 4121 and 4321) and the maximum torque that can be transmitted through clutch mechanism 4000. Depending upon the selection of particular clutch design parameters (including the clutch preload, the lead angle of multi-start threads 4201 and 4301, and the taper angle of frustoconical clutch surfaces 4111 and 4211), the clutch mechanism either may rotationally slip when a left-hand torque of a selected magnitude ("selected left-hand slip torque") is reached, or it may remain locked. Suitable values for the lead angle of multi-start threads 4201 and 4301 and the taper angle of clutch surfaces 4111 and 4211 will depend upon the coefficients of friction of these contacting surfaces.

FIG. 18 is a longitudinal cross-section through clutch mechanism 4000 with drive clutch body 4100 rotated, in the right-hand direction relative to driven clutch body 4300, to an over-running condition. Disengagement flanks 4203 and 4303 are in contact, and right-hand torque transmitted through multi-start threads 4201 and 4301 will reduce the contact force and encourage rotational slip between clutch surfaces 4111 and 4211. When clutch mechanism 4000 is over-running, the right-hand slip torque will depend upon the selected clutch preload provided by wave spring 4400 and the taper angle of frustoconical clutch surfaces 4111 and 4211 and other clutch design parameters (such as the coefficient of friction between the clutch surfaces) as will be apparent to persons skilled in the art.

It will be readily appreciated by persons skilled in the art that various alternative embodiments may be devised without departing from the scope of the present disclosure, including modifications that may use equivalent structures or materials subsequently conceived or developed.

It is to be especially understood that it is not intended for apparatus in accordance with the present disclosure to be limited to any particular described or illustrated embodiment or embodiments, and that the substitution of a variant of a claimed element or feature, without any substantial resultant change in the working of the apparatus and methods, will not constitute a departure from the scope of the disclosure.

In this patent document, any form of the word "comprise" is to be understood in its non-limiting sense to mean that any element or feature following such word is included, but elements or features not specifically mentioned are not excluded. A reference to an element or feature by the indefinite article "a" does not exclude the possibility that more than one of such element or feature is present, unless the context clearly requires that there be one and only one such element or feature.

Any use herein of any form of the terms "engage", "couple", "attach", or any other term describing an interaction between elements is not meant to limit the interaction to direct interaction between the subject elements, and may also include indirect interaction between the elements such as through secondary or intermediary structure.

Relational and conformational terms such as (but not limited to) "coaxial", and "cylindrical" are not intended to denote or require absolute mathematical or geometrical precision. Accordingly, such terms are to be understood as denoting or requiring substantial precision only (e.g., "substantially coaxial" or "generally cylindrical") unless the context clearly requires otherwise. In particular, it is to be understood that any reference herein to an element as being "generally cylindrical" is intended to mean that the element in question may have inner and outer diameters that vary along the length of the element.

In addition, and unless specifically noted otherwise, any reference herein to an element being "axisymmetric" or "substantially axisymmetric" is intended to denote that the element in question would appear substantially axisymmetric in transverse cross-section, although the cross-sectional configuration of the element might vary along its length.

Any reference herein to a clutch mechanism being rotated to a "locked" condition is to be understood as meaning that some finite amount of relative rotation between the drive clutch body and the driven clutch body will occur as the torque transmitted through the clutch mechanism increases. The finite amount of relative rotation depends on the design parameters of the clutch mechanism, which include the clearances between clutch components (backlash), the mechanical compliances of the components, the taper angle of the frustoconical clutch surfaces, and the first lead angle of the first helical coupling or the second lead angle of the second helical coupling (depending on the rotational direction).

Wherever used in this document, the terms "typical" and "typically" are to be understood and interpreted in the sense of being representative of exemplary common usage or practice only, and are not to be understood or interpreted as implying essentiality or invariability.

LIST OF ILLUSTRATED ELEMENTS

Element Number Description
- 100 CRT (casing running tool)
- 110 main body assembly
- 111 load adaptor
- 112 threaded connection
- 120 gripping assembly
- 121 bumper
- 122 land surface
- 123 cage
- 124 grip surface
- 130 axial extension linkage
- 131 drive cam body
- 132 intermediate cam body
- 133 driven cam body
- 134 latch body
- 135 striker body
- 136 conical spring washer
- 137 coil spring
- 1000 externally-gripping casing running tool (CRTe)
- 1001 tubular workpiece
- 1010 upper latch assembly
- 1020 lower latch assembly
- 1030 gas spring
- 1100 variable-length axial extension linkage
- 1110 drive cam body
- 1111 load adaptor
- 1120 intermediate cam body Element Number Description
- 1130 driven cam body
- 1140 latch body
- 1150 striker body
- 1160 striker spring
- 1200 latch release mechanism
- 1210 trigger element
- 1211 trigger spline
- 1212 trigger pocket
- 1213 trigger dog teeth
- 1220 bumper element
- 1221 bumper spline
- 1222 bumper cam slot
- 1223 land surface
- 1230 trigger follower
- 1240 cage connector
- 1250 trigger spring
- 1300 main body assembly
- 1301 main body bore
- 1310 main body upper housing
- 1320 main body lower housing
- 1330 main body lock sleeve
- 1400 grip assembly
- 1410 cage
- 1420 jaws
- 2000 bumper assembly incorporating a clutch mechanism
- 2001 longitudinal axis
- 2010 drive clutch body (comprising 2100+2200+2600+2700)
- 2030 driven clutch body (comprising 2300+2800)

Element Number Description
- 2100 bumper element
- 2101 bumper spline
- 2102 bumper cam slot
- 2103 bumper-clutch spline
- 2104 groove
- 2200 bushing
- 2201 drive bearing surface
- 2300 driven clutch element
- 2301 driven bearing surface
- 2302 driven clutch ramp
- 2303 driven clutch stop
- 2400 O-ring (axial biasing means)
- 2500 intermediate clutch body
- 2501 intermediate clutch surface
- 2502 intermediate clutch ramp
- 2503 intermediate clutch stop
- 2600 drive clutch element
- 2601 drive clutch surface
- 2603 drive clutch spline
- 2700 retaining ring
- 2800 bumper plate
- 3000 clutch mechanism
- 3001 longitudinal axis
- 3010 drive clutch body (comprising 3100+3600+3700)
- 3100 drive element
- 3101 drive bearing surface
- 3103 drive element spline
- 3104 groove Element Number Description
- 3300 driven clutch body
- 3301 driven bearing surface
- 3302 driven clutch right-hand ramp
- 3303 driven clutch left hand ramp
- 3400 wave spring (axial biasing means)
- 3500 intermediate clutch body
- 3501 intermediate clutch surface
- 3502 intermediate clutch right-hand ramp
- 3503 intermediate clutch left hand ramp
- 3600 drive clutch element
- 3601 drive clutch surface
- 3603 drive clutch spline
- 3700 retaining ring
- 4000 clutch mechanism
- 4001 longitudinal axis
- 4100 drive clutch body (comprising 4110+4120+4130)
- 4110 drive clutch element
- 4111 drive clutch surface
- 4112 drive spline
- 4113 groove
- 4120 bushing
- 4121 drive bearing surface
- 4122 bushing spline
- 4130 retaining ring
- 4200 intermediate clutch body
- 4201 multi-start thread
- 4202 engagement flank
- 4203 disengagement flank
- 4211 intermediate clutch surface Element Number Description
- 4300 driven clutch body
- 4301 multi-start thread
- 4302 engagement flank
- 4303 disengagement flank
- 4321 driven bearing surface
- 4400 wave spring (axial biasing means)

Embodiments in which an exclusive property or privilege is claimed are defined as follows:

1. A generally axisymmetric clutch mechanism having a longitudinal axis and comprising:
   (a) a drive clutch body having a drive bearing surface and a frustoconical drive clutch surface;

(b) an intermediate clutch body having a frustoconical intermediate clutch surface configured for sliding contacting engagement with the frustoconical drive clutch surface;

(c) a driven clutch body having a driven bearing surface configured for transferring compressive axial force to the drive bearing surface; and (d) rotational drag means generating resistance to rotational slippage between the drive clutch surface and the intermediate clutch surface;

wherein:

(e) the drive clutch body, the intermediate clutch body, and the driven clutch body are coaxially aligned to the longitudinal axis of the clutch mechanism;

(f) the intermediate clutch body and the driven clutch body are helically coupled in a first rotational direction relative to the longitudinal axis of the clutch mechanism, forming a first helical coupling having a first lead angle; and (g) the taper angle of the drive clutch surface and the intermediate clutch surface and the first lead angle are selected such that the clutch mechanism will lock when the drive clutch body is rotated relative to the driven clutch body in the first rotational direction.

2. The mechanism as in claim 1 wherein the rotational drag means comprises axial biasing means generating an axial clutch preload force urging engagement of the drive clutch surface and the intermediate clutch surface.

3. The clutch mechanism as in claim 2 wherein the axial biasing means comprises one or more means selected from the group consisting of:

(a) the weight of the intermediate clutch body being supported by the drive clutch body;

(b) the weight of the drive clutch body being supported by the intermediate clutch body;

(c) one or more elastomeric O-rings compressed between the intermediate clutch body and the driven clutch body;

(d) one or more Belleville washers compressed between the intermediate clutch body and the driven clutch body;

(e) a wave spring compressed between the intermediate clutch body and the driven clutch body; and (f) a coil spring compressed between the intermediate clutch body and the driven clutch body.

4. The clutch mechanism as in claim 2 wherein the axial clutch preload force, the taper angle of the drive clutch surface and the intermediate clutch surface, and the first lead angle are selected such that the clutch mechanism will rotationally slip when a torque of a first selected magnitude in the first rotational direction is transmitted through the clutch mechanism.

5. The clutch mechanism as in claim 2 wherein:

(a) the intermediate clutch body and the driven clutch body are helically coupled in a second rotational direction opposite to the first rotational direction, forming a second helical coupling having a second lead angle;

(b) the taper angle of the drive clutch surface and the intermediate clutch surface and the second lead angle are selected such that the clutch mechanism will lock when the drive clutch body is rotated relative to the driven clutch body in the second rotational direction; and (c) the axial clutch preload force, the taper angle of the drive and intermediate clutch surfaces, and the second lead angle are selected such that the clutch mechanism will rotationally slip when a torque of a second selected magnitude in the second rotational direction is transmitted through the clutch mechanism.

6. The clutch mechanism as in claim 1 wherein the rotational drag means comprises one or more means selected from the group consisting of:

(a) a viscous lubricant between the drive clutch surface and the intermediate clutch surface;

(b) the weight of the intermediate clutch body being supported by the drive clutch body; and (c) the weight of the drive clutch body being supported by the intermediate clutch body.

7. The clutch mechanism as in claim 1 wherein:

(a) the intermediate clutch body and the driven clutch body are helically coupled in a second rotational direction opposite to the first rotational direction, forming a second helical coupling having a second lead angle; and (b) the taper angle of the drive clutch surface and the intermediate clutch surfaces and the second lead angle are selected such that the clutch mechanism will rotationally slip when the drive clutch body is rotated relative to the driven clutch body in the second rotational direction.

8. The clutch mechanism as in claim 1 wherein:

(a) the intermediate clutch body and the driven clutch body are helically coupled in a second rotational direction opposite to the first rotational direction, forming a second helical coupling having a second lead angle; and (b) the taper angle of the drive clutch surface and the intermediate clutch surface and the second lead angle are selected such that the clutch mechanism will lock when the drive clutch body is rotated relative to the driven clutch body in the second rotational direction.

9. The clutch mechanism as in claim 1 wherein the drive bearing surface and the driven bearing surface are frustoconical.

10. The clutch mechanism as in claim 1 wherein:

(a) a selected one of the drive clutch body and the driven clutch body comprises a bumper element of a casing running tool, said bumper element being coupled to a latch assembly of the casing running tool; and (b) the non-selected one of the one of the drive clutch body and the driven clutch body comprises a bumper plate of the casing running tool, said bumper plate being configured for contacting and tractional rotational engagement with an upper end of a casing joint.

* * * * *